United States Patent
Bellamkonda et al.

(10) Patent No.: US 9,603,003 B2
(45) Date of Patent: Mar. 21, 2017

(54) METHODS AND APPARATUS FOR RADIO NETWORK SCANNING USING GEO-TAGGED INFORMATION FROM WIRELESS CLIENT DEVICES OF HETEROGENEOUS WIDE AREA NETWORKS

(71) Applicant: Google Technology Holdings LLC, Mountain View, CA (US)

(72) Inventors: Krishna K. Bellamkonda, Lake Zurich, IL (US); Nischal Y. Patel, Gilberts, IL (US); Brett L. Robertson, Mundelein, IL (US); Daniel P. Rose, Chicago, IL (US); Dean L. Thorson, Grayslake, IL (US); Malhar D. Vaishnav, Gilberts, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 173 days.

(21) Appl. No.: 14/277,831

(22) Filed: May 15, 2014

(65) Prior Publication Data

US 2015/0256993 A1    Sep. 10, 2015

Related U.S. Application Data

(60) Provisional application No. 61/948,075, filed on Mar. 5, 2014.

(51) Int. Cl.
H04W 4/00   (2009.01)
H04W 8/12   (2009.01)

(52) U.S. Cl.
CPC .................................. *H04W 8/12* (2013.01)

(58) Field of Classification Search
USPC .................. 455/404.2–406, 432.1–440, 442, 455/452.2–453, 456.1–456.3;
(Continued)

(56) References Cited

U.S. PATENT DOCUMENTS 8,060,119 B2 * 11/2011 Keidar .............. H04W 52/0229
                                                           370/329
8,521,178 B2    8/2013 Abraham et al.
(Continued)

FOREIGN PATENT DOCUMENTS

EP            2074858 B1    1/2013

*Primary Examiner* — Dai A Phuong
(74) *Attorney, Agent, or Firm* — Faegre Baker Daniels LLP

(57) ABSTRACT

A method includes collecting roaming connectivity information for a plurality of wide area networks from a plurality of mobile devices, independently of the wide area networks, receiving the roaming connectivity information at a server and relating the connectivity information to the wide area networks and to a plurality of geographic locations to create a roaming network connectivity information database, generating a list of candidate wide area networks to serve as roaming networks for a specific mobile device and a given location based on the roaming connectivity information, and sending a preferred roaming list to the specific mobile device, the preferred roaming list including the list of candidate wide area networks. The method may include receiving location prediction information from the mobile device, and generating the list of candidate wide area networks based on a predicted location.

18 Claims, 6 Drawing Sheets

(58) Field of Classification Search
USPC .................................................. 370/328–333
See application file for complete search history.

(56) References Cited

U.S. PATENT DOCUMENTS

| | | | | |
|---|---|---|---|---|
| 2004/0072581 | A1* | 4/2004 | Tajima | H04W 36/32 455/456.1 |
| 2007/0281694 | A1* | 12/2007 | Lin | H04W 48/18 455/435.2 |
| 2009/0325574 | A1* | 12/2009 | Izawa | H04W 48/08 455/432.1 |
| 2010/0167724 | A1 | 7/2010 | Haran et al. | |
| 2010/0285816 | A1* | 11/2010 | Vos | H04W 60/04 455/456.1 |
| 2011/0130140 | A1* | 6/2011 | Fadell | H04W 8/065 455/435.2 |
| 2012/0243467 | A1* | 9/2012 | Vallurupalli | H04W 48/18 370/328 |
| 2014/0199998 | A1* | 7/2014 | Balasubramanian | H04J 11/0093 455/434 |
| 2015/0031328 | A1* | 1/2015 | Ramprasad | H04W 12/12 455/405 |
| 2015/0043417 | A1* | 2/2015 | Liu | H04W 80/04 370/312 |
| 2015/0208227 | A1* | 7/2015 | El Moumouhi | H04W 48/18 455/432.1 |
| 2015/0220952 | A1* | 8/2015 | Sen | H04W 4/028 705/7.34 |
| 2015/0257076 | A1* | 9/2015 | Macwan | H04W 4/00 455/436 |

* cited by examiner

METHODS AND APPARATUS FOR RADIO NETWORK SCANNING USING GEO-TAGGED INFORMATION FROM WIRELESS CLIENT DEVICES OF HETEROGENEOUS WIDE AREA NETWORKS

CROSS-REFERENCE TO RELATED APPLICATIONS

The present application claims priority to U.S. Provisional Patent Application No. 61/948,075, filed Mar. 5, 2014, entitled "METHODS AND APPARATUS FOR RADIO NETWORK SCANNING USING GEO-TAGGED INFORMATION FROM WIRELESS CLIENT DEVICES OF HETEROGENEOUS WIDE AREA NETWORKS," which is hereby incorporated by reference herein in its entirety, and which is assigned to the same assignee as the present application.

FIELD OF THE DISCLOSURE

The present disclosure relates generally to wireless networks and mobile devices and more particularly to mobile device acquisition of a preferred roaming list (PRL) containing public land mobile network (PLMN) information for various PLMNs.

BACKGROUND

A mobile device user is often a subscriber to a wide area network owned and operated by a given network operator or carrier that owns the associated network infrastructure. The wide area network serves as a "home network" for the mobile device. Mobile devices that move outside of the coverage area of their respective home networks often utilize roaming services that enable a mobile device to connect to various public land mobile networks (PLMNs) which are wireless wide area networks (WANs) that provide mobile device service for a given geographic location. Some geographic locations may be served by more than one PLMN such that a mobile device user may have a choice as to which PLMN is preferable. In most cases, a mobile device is subscribed to a single PLMN, and that PLMN determines which other PLMNs are "preferred" for its customer mobile devices based on contractual arrangements existing between these PLMN entities. In other business models, a mobile virtual network operator (MVNO) may provide mobile devices with services using various PLMNs, where the MVNO entity contractually purchases or leases access to network resources on the various PLMNs without owning any of the network infrastructure. A mobile device may access a PLMN, either automatically or manually, by selecting it from a preferred roaming list (PRL) stored within the mobile device such as in memory or on a subscriber identity module (SIM) card. A mobile device may obtain a PRL from its subscribed PLMN (i.e. home network), or from an MVNO, and may scan for available PRL PLMNs in the location of the mobile device when the mobile device is roaming (i.e. when outside of the home network coverage area), anytime that coverage from the home PLMN is lost, or when the mobile device is powered on. A mobile device using an MVNO business model must also conduct scanning at various times such as when the mobile device is powered on, etc.

One issue that arises when scanning to find PRL networks in a multi-radio networking scenario is that, the mobile device will attempt to scan for all the bands because some of the "preferred" PLMNs may not be found. Such complete scans can take as much as 12 minutes and can cause extensive battery drain with no resulting service to the end-user. In addition, even when a PRL is available for a wireless service provider, who own multiple bands and multiple radio frequencies (such as, but not limited to, an MVNO), overhead is involved in finding a suitable PLMN on which to "camp." This complexity is further increased for a global roamer who moves between countries where wireless network providers utilize a multiplicity of bands and frequencies.

DETAILED DESCRIPTION

Figure 1:
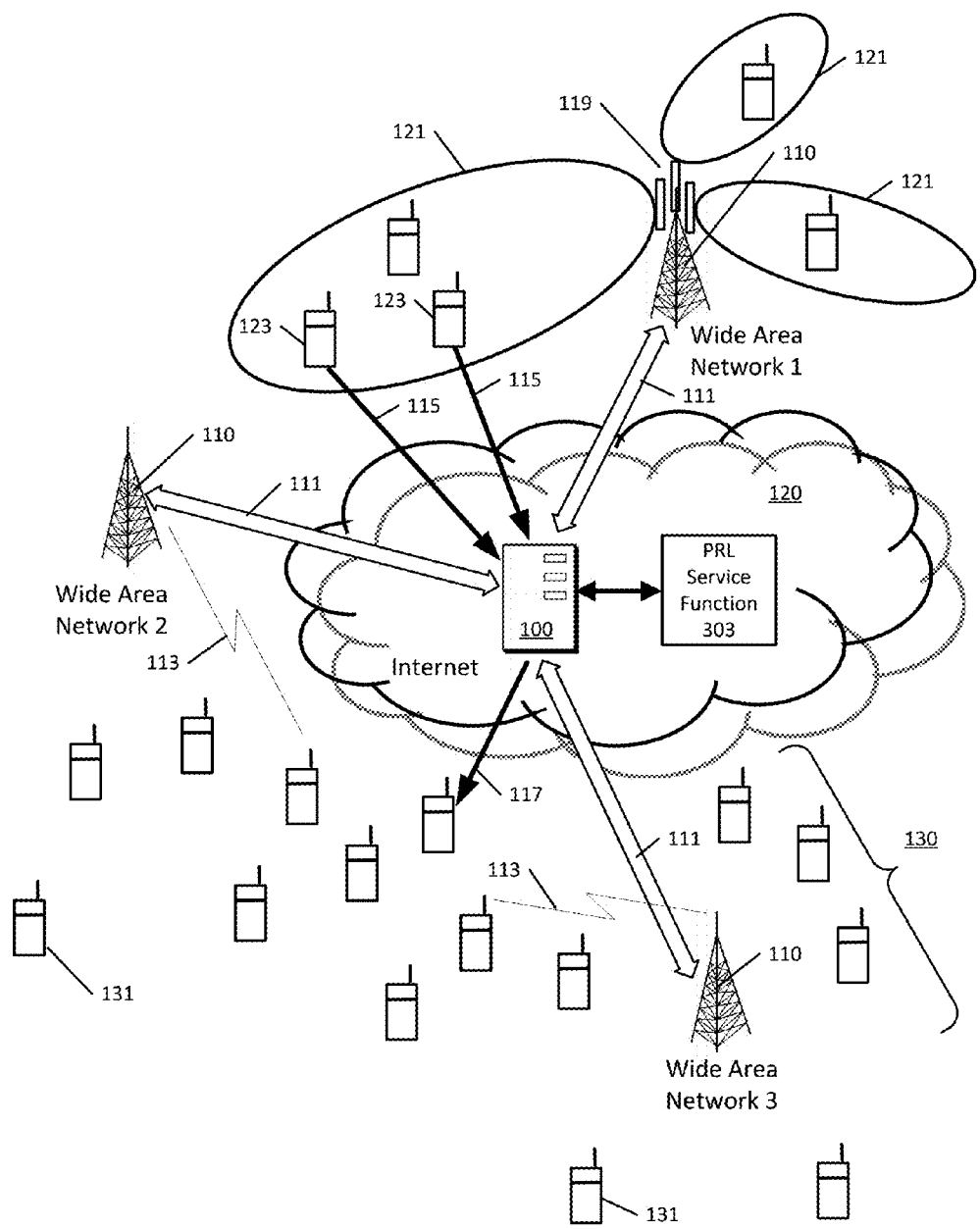
FIG. 1 is a diagram illustrating mobile devices collecting connectivity information from various wide area networks in accordance with an embodiment.

Briefly, the disclosed embodiments include a server that collects PLMN connectivity information for various heterogeneous PLMNs by obtaining PLMN connectivity information observed by individual mobile devices independently of the specific PLMN to which any particular mobile device is subscribed. The information collected is tagged to specific geographic locations (i.e. "geo-tagged") such that it may be utilized by other mobile devices, at any given location, to expedite identification of a suitable PLMN on which to camp.

A preferred roaming list (PRL) service function, which may be resident on the server, acts to anticipate connectivity band and frequency information for a given mobile device, at a given location, rather than only providing a PLMN ID as is done in existing systems. The PRL service function may also use predicted travel path information for a mobile device to provide that mobile device with customized suggestions of one of more PLMNs that may be selected. That is, the PRL service function generates customized, user specific PRLs based on location and other conditions of a specific mobile device.

In accordance with the embodiments, each mobile device independently collects information such as, but not limited to, the band, frequency, cell, etc. on each PLMN on which the mobile device camps, appropriately geo-tags the information, and provides the information to a server. The collected information may also include, among other things, the overall quality and cost (such as, but not limited to, cost in mobile device current drain) for a camped-on cell or other useful information.

The server stores and holds the information from the multiple mobile devices and for multiple PLMNs. The stored information may include, among other things, PLMN identification information, PLMN cell identification, frequency band information and information regarding the overall quality obtained by the mobile devices reporting on the respective connectivity. The server maintains the collected information and may sort the collected information using any suitable criteria such as, but not limited to, the overall quality obtained using a given PLMN at a given location. This information may then be made available to other mobile devices using a predictive application such as, but not limited to, an intelligent personal assistant. The intelligent personal assistant includes the capability to predict the flight or route information for a specific mobile device user.

Based on a current location and an expected location for a mobile device, a user specific, prioritized PRL is generated and sent to the mobile device. This PRL could be sent automatically or may be downloaded on demand at the mobile device. The mobile device may thus use the PRL to prune the PLMNs that the device looks for while doing full system scans. For a mobile device that supports multiple PLMNs in an MVNO scenario the PRL allows the mobile device to locate a PLMN and camp on an appropriate cell within a few seconds.

The disclosed embodiments provide various methods of operation and also provide a server that includes a PRL service function, a network transceiver operative to provide a connection to the Internet, a network statistics database, and at least one processor, operatively coupled to the network transceiver and to the network information database. The at least one processor is operative to perform operations in accordance with the methods described briefly above and more fully below.

Turning now to the drawings, FIG. 1 illustrates various mobile devices 130 and various heterogeneous wide area networks 110 which may also be referred to as public land mobile networks (PLMNs). Each of these various heterogeneous wide area networks (or PLMNs) 110 is operatively coupled to the Internet 120 via an appropriate backhaul connection 111 and is operative to provide Internet 120 access to one or more subscribed mobile devices. Any one of the plurality of mobile devices 130 may be a subscriber to any one of the heterogeneous wide area networks 110, or may be a customer of an MVNO (mobile virtual network operator). An MVNO may provide a mobile device with access to resources on one or more of the wide area networks 110. The plurality of mobile devices 130 change location dynamically such that they may at times be outside of the radio coverage area of any particular wide area network and therefore may no longer be able to establish a connection, for voice or data communication, with their subscribed wide area network 110. This scenario is referred to as "roaming" in that the mobile device must then become a "visitor" on a different, not-subscribed to PLMN, i.e. a visited network (also visited PLMN or VPLMN). Each one of the mobile devices 130 is able to form a radio connection with its respective wide area network 110 via a wireless radio link 113 that uses the access technology appropriate for the particular wide area network 110. Some of the mobile devices 130 may be capable of using two or more wireless radio link technologies (i.e. access technologies) to access the various wide area networks 110. Also, some of the wide area networks 110 may be capable of using two or more wireless radio link technologies.

In accordance with the embodiments, each one of the mobile devices 130 may communicate with a server 100, and an associated PRL service function 303, using the mobile device's subscribed wide area network 110, or using a visited network when accessible, and by way of the appropriate backhaul connection 111 which provides connectivity to the Internet 120. The server 100, in accordance with the embodiments, may be a cloud-based server and may also be a distributed server within the Internet 120. The server 100 provides a preferred roaming list (PRL) service which is facilitated by the PRL service function 303. The PRL service function 303 is operative to provide any mobile device of the mobile devices 130 with a customized, mobile device specific PRL which is an alternative to a PRL that may otherwise be obtained from each mobile device 130 home network.

In accordance with the embodiments, some of the mobile devices 130 will collect connectivity information (also referred to herein as "roaming connectivity information"), with each of the mobile devices collecting the connectivity information from one or more of the wide area networks 110 as the mobile devices move through different geographic areas that have radio frequency (RF) coverage from respective one or more of the wide area networks 110. That is, any of the mobile devices 130 may collect connectivity information at a particular time, and at a particular geographic location based on the existence of radio coverage at that location. The mobile devices 130 that have collected this connectivity information will also send the collected connectivity information to the server 100 from time-to-time. The mobile devices 130 may collect connectivity information based on either having camped on a cell of a given wide area network or based on having established a voice or data connection using the network either as a subscriber or as a visitor such as when roaming. A mobile device is considered to have "camped" on a cell when the mobile device completes a cell selection (or reselection) process and has selected a cell from which it may receive available services. The cell on which such a mobile device "camps" on is referred to as a "serving cell." The wide area network may or may not have knowledge of the camped mobile device.

Cells of a wide area network are associated with a base transceiver station and usually refer to one or more radio coverage sectors which are implemented using radio antennas 119 (connected to the base transceiver station) having various beam widths such that the antenna radiation pattern covers an intended area. In FIG. 1, ellipses are used to represent the radio coverage areas or "sectors" 121 of a three sector cell. It is to be understood that the radio coverage areas are not actually elliptical but that ellipses are used for purposes of explanation. As one example, three antennas 119 may each have a 120° beam angle such that three 120° sectors cover an area surrounding a cell tower. Antenna down-tilts and base station transceiver power settings further determine the actual radio coverage provided by the cell. Mobile devices 123 are roaming (i.e. outside of their respective home network radio coverage areas) and are camped on a cell sector 121. In accordance with the embodiments, the mobile devices 123 send roaming connectivity information 115 to the server 100 using an Internet connection. The PRL service function 303 parses and stores the roaming connectivity information 115 and associates it with wide area network 1 for future reference in generating PRLs. The PRL service function 303 may also prioritize the wide area networks listed in the PRL in some embodiments. The roaming connectivity information 115 may include, among other things, PLMN identification information, PLMN cell identification information, frequency band information and information regarding the overall quality obtained by the mobile devices reporting on the respective connectivity. The quality information may include various quality indicators based on known quality metrics used for assessing wireless network connectivity and may be voice quality metrics, data connectivity metrics, etc., or combinations thereof.

In the example of FIG. 1, another mobile device, which may still be within the coverage area of its respective home network, receives a PRL 117 from the server 100 also over an Internet connection. In accordance with the embodiments, the PRL 117 may be sent to the mobile device automatically or upon request of the mobile device.

Each of the mobile devices 130 that send roaming connectivity information 115 are also subscribed to the PRL service provided by the server 100, and PRL service function 303, in accordance with the embodiments. Accordingly, the server 100 manages, creates and promulgates PRLs based on time and geographic locations, and additional criteria in some embodiments. The server 100 may also use one or more weighting algorithms to prioritize PLMNs of the promulgated PRLs. For example, the server 100 may provide ratings for each PLMN related to data rates achieved, RF coverage strength, various quality indicators, etc. or some combination of such ratings. In other words, the rating for any specific wide area network 110 may change per location, time, etc. and may be different for different mobile devices with respect to the customized PRLs.

In accordance with the embodiments, each of the mobile devices 130 may send either occasional or periodic updates over its respective subscribed wide area network, or over a visited wide area network, to the server 100. These updates provide information related to the current service being provided by the mobile device's respective serving wide area network 110 at specific points in time and at specific geographic locations. Occasional updates may be sent by mobile devices in response to the occurrence of specific, predetermined triggering conditions. For example, occasional updates may be triggered in some embodiments by changes in radio frequency (RF) coverage as determined by some RF coverage metric (for example, signal strength, signal-to-noise ratio, signal quality, etc.), change of location, or some other criteria or combinations thereof. In other embodiments, the updates may be periodic and may occur at predetermined time intervals. Such periodic updates may also begin in response to one or more trigger conditions such as, for example, when a mobile device travels out of RF coverage range of its respective home wide area network. Periodic updates are sent according to a schedule of the predetermined time intervals which may be defined by the server 100 and communicated to the mobile devices. In other words, occasional updates may only be sent in response to a trigger condition such as when a mobile device camps on a cell of a visited network or otherwise engages the visited network for services, such as in the example of mobile devices 123. Such an occasional update may therefore be considered a "one shot" operation in that a mobile device will send an update of roaming connectivity information 115 only in response to predetermined triggers. On the other hand, although periodic updates may also begin in response to predetermined triggers, periodic updates continue to be sent based on the schedule until the mobile device connectivity changes such as when the mobile device returns to its home wide area network. Each of the mobile devices 130 includes a client coordination function that determines when the mobile device will obtain data and when the mobile device will send that data to the server 100. The mobile device may obtain the data from the mobile device itself or from its serving wide area network 110 or from both. In accordance with the embodiments, and as shown in FIG. 3, the server 100 maintains a network information database 307 and a mobile device information database 309 that are used to determine customized PRLs for each mobile device 130 subscribed to the PRL service. Data obtained from the mobile device itself may be stored in the mobile device information database 309 while the data obtained from the wide area networks 110 is stored in the network information database 307. The example embodiment of FIG. 3 also provides further details of a server 100 while FIG. 2 provides further details of an example embodiment of a mobile device 200.

Figure 2:
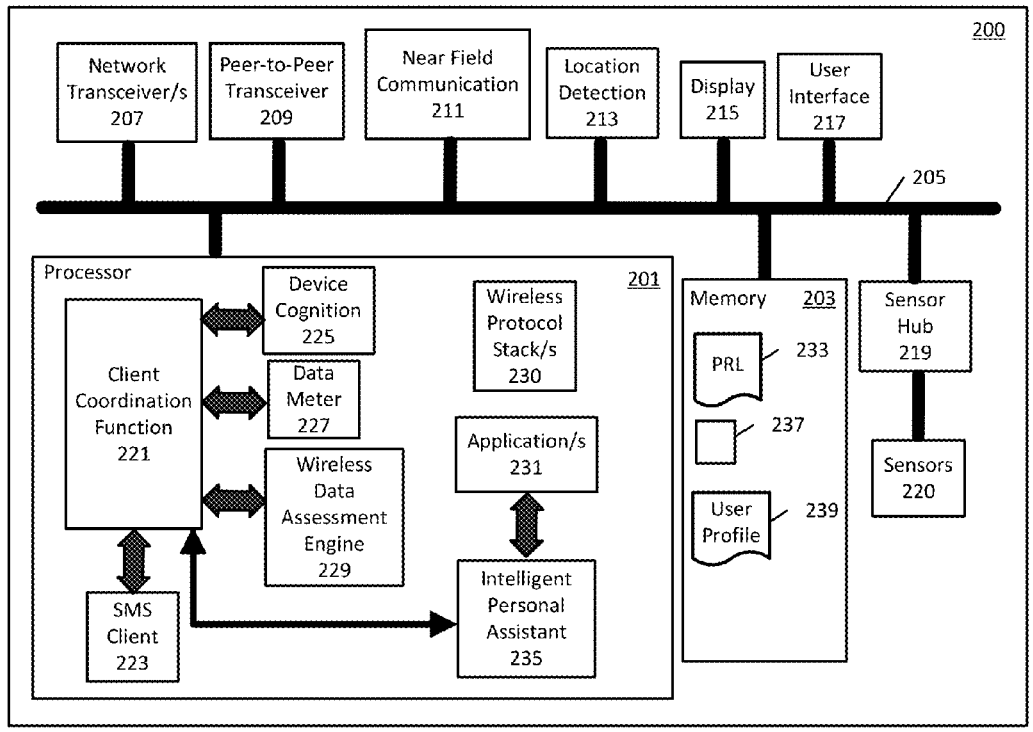
FIG. 2 is block diagram of mobile device in accordance with an embodiment.
Figure 3:
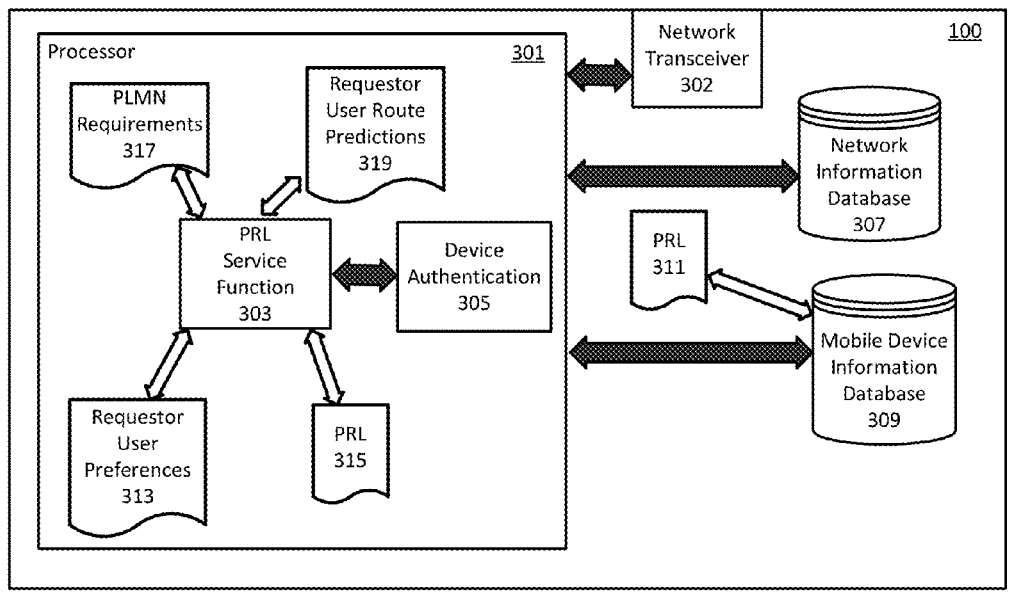
FIG. 3 is block diagram of a server in accordance with an embodiment.

In FIG. 2, an example mobile device 200 includes at least one internal communication bus 205 which provides operative coupling between the various components. The mobile device 200 components include, but are not limited to, one or more network transceivers 207, a peer-to-peer transceiver 209, near field communication logic 211, location detection logic 213, a display 215, a user interface 217, at least one processor 201, a memory 203, and a sensor hub 219. The sensor hub 219 is operatively coupled to a plurality of sensors 220 which may include thermal sensors, proximity sensors, accelerometers, gyroscopic sensors, light sensors, etc. The processor 201 is operative to execute at least one wireless protocol stack 230 and various other applications 231. Each of the various components of the mobile device 200 that are operatively coupled to the communication bus 205 may accordingly send information to, or receive information from, the processor 201.

In accordance with the embodiments, the processor 201 is also operative to execute a client coordination function 221. The client coordination function 221 may interact and communicate with a short message service (SMS) client 223 via APIs (application programming interfaces) or via other appropriate operative coupling. The client coordination function 221 may also interact and communicate with a device cognition module 225, a data meter 227, a wireless data assessment engine 229 and an intelligent personal assistant 235 via one or more APIs.

The device cognition module 225 is operative to communicate with the sensor hub 219 to obtain data from the plurality of sensors 220. This data may include information about the position of the mobile device 200, such as whether the mobile device 200 is stationary, in a docking station, placed flatly on a table surface, etc. and other information related to the ambient environment surrounding the mobile device 200. The location detection logic 213 may also be accessed by the device cognition module 225 to obtain location information for the mobile device 200. The client coordination function 221 may manage the collection of data by the device cognition module 225 and may determine time intervals or locations at which the device cognition module 225 is to obtain data from the sensor hub 219 and the location detection logic 213.

The data meter 227 is operative to monitor the one or more network transceivers 207, the peer-to-peer transceiver 209, or both, by way of one or more wireless protocol stacks 230 to determine the data throughput or data rate being achieved for the mobile device 200 at a particular point in time and at specific locations. The wireless data assessment engine 229 may also assess characteristics of a wireless channel formed by the one or more network transceivers 207 and report those characteristics to the client coordination function 221. These assessed characteristics may be related to voice channels, data channels or both. More particularly, the wireless data assessment engine 229 is operative to predict poor or sub optimal radio coverage at specific locations either by monitoring internal functions of the mobile device 200, such as those obtained by the sensor hub 219 or by monitoring inputs that may be received from the server 100 as will be discussed in further detail below. The client coordination function 221 collects the above described data from the device cognition module 225, the data meter 227, and the wireless data assessment engine 229 and stores it in a user profile 239. Some or all of the data contained in the user profile 239 is then subsequently sent to the PRL service function 303. Therefore a portion of the data contained in the user profile 239 is mobile device 200 operations data which is stored in the mobile device information database 309 and another portion is roaming connectivity information which is stored in the network information database 307. The client coordination function 221 also obtains location data from the location detection logic 213 and "geo-tags" the data stored in the user profile 239. Some of the collected data may also be geo-tagged by the other components that obtain the data initially such as the device cognition module 225, data meter 227 or wireless data assessment engine 229. This geo-tagging enables the PRL service function 303 to associate the roaming connectivity information 115 and any available mobile operations data with geographic areas and to assemble PRLs for those specific geographic areas. The PRL service function 303 may use the geo-tag location information to assemble PRLs for geographic areas at varying levels of granularity. These operations are described in further detail herein below.

Continuing to refer to FIG. 2, the mobile device 200 may include various applications 231 one of which may be an intelligent personal assistant 235. The intelligent personal assistant 235 may predict where the mobile device 200 may be at a future point in time, such as by observing the mobile device 200 user's calendar and travel schedule, location information along often traveled routes, etc. and may provide these predictions to the client coordination function 221. The client coordination function 221 may therefore receive predictions and other information from the device cognition module 225, the data meter 227, the wireless data assessment engine 229 or the intelligent personal assistant 235, and may use this information to makes various decisions regarding connections formed by the mobile device 200. More specifically, the client coordination function 221 may use predictions from the intelligent personal assistant 235 to determine when to request a PRL and to determine for which geographic locations the PRL should provide information. In one example, the client coordination function 221 may receive a prediction or indication from the intelligent personal assistant 235 that the mobile device 200 will be in a European country on a specified date. The client coordination function 221 may request a PRL for the European country so that the PRL is available to the mobile device 200 user when needed. Alternatively, the client coordination function 221 may receive destination and route prediction information from the intelligent personal assistant 235 and store it in the user profile 239. The destination and route prediction information may then be sent to the PRL service function 303 along with roaming connectivity information 115 and mobile operations data. The information stored in the user profile 239 may be restricted by user settings and these settings may also be stored in the user profile. For example, the user may restrict the client coordination function 221 use of prediction information and therefore this information may not be sent, or may not be used, by the PRL service function 303 in that case.

As mentioned previously above, a mobile device may request a PRL or may receive PRL updates automatically. However, there may be situations where the mobile device 200 has lost or suddenly loses radio coverage from its subscribed-to wide area network 110 and therefore cannot establish an Internet connection to request or receive a PRL from the PRL service function 303. For example in FIG. 1, mobile devices 131 may be subscribed to wide area network 1 but are outside of the RF coverage area and unable to establish an Internet connection to communicate with the server 100. In that case, the SMS client 223 may be used by the client coordination function 221, to send a request message to the server 100 to request a PRL so that the mobile device 200 may establish a new wireless connection on a visited wide area network. In accordance with the embodiments, the new connection can be obtained through any of the wide area networks 110 including those to which the mobile device 200 is not a subscriber, i.e. a visited network. The PRL may also be sent to the mobile device 200 in one or more SMS messages. This PRL is customized for the mobile device in the various embodiments by way of the server 100 and the PRL service function 303 which are illustrated in further detail in FIG. 3.

The server 100 includes at least one processor 301 that is operatively coupled to a network transceiver 302 which enables the server 100 to communicate with the various wide area networks 110 over the backhaul connections 111. As discussed previously above, the server 100 and the PRL service function 303 also maintain the network information database 307 and a mobile device information database 309 which may or may not be integrated onto the server 100. That is, the network information database 307, the mobile device information database 309 or both may be stored on cloud servers remote from the server 100 but that are accessible to the server 100 via network connectivity. In some embodiments, the network information database 307, the mobile device information database 309 or both may also be distributed databases that are distributed among multiple cloud servers. In any of these embodiments, the processor 301 is operatively coupled to the network information database 307 and to the mobile device information database 309 by using any of various appropriate database interface protocols and network connectivity as needed in embodiments having remotely located or distributed databases. In accordance with the embodiments, the processor 301 is operative to execute a PRL service function 303 and a device authentication function 305. In some embodiments, the device authentication function 305 may reside on a different server that is operatively coupled to the server 100 in a manner similar to embodiments using remote or distributed databases. The PRL service function 303, among other things, manages the creation of customized PRLs, such as PRL 315 and PRL 311, and manages PRL requests from the mobile devices 130. The PRLs may be created on-the-fly in response to a request or automatically in accordance with information stored in the mobile device information database 309 and/or predictive information that may be received from a specific mobile device intelligent personal assistant 235. This information may also be stored in the mobile device information database 309 and managed by the PRL service function 303 in accordance with the embodiments.

The customized PRLs generated may be constrained by various considerations such as, but not limited to, technical requirements such as wireless link technology capability of the mobile device, contractual requirements of the service provided by server 100 or related to one or more of the wide area networks 110 subscription contract requirements, MVNO contract requirements, or other requirements and policies, etc. That is, the PRL service function 303 may utilize, as inputs in any combination without limitation, PLMN requirements 317, requestor user preferences 313, and requestor user route predictions 319 from the intelligent personal assistant 235, to generate a mobile device specific, customized PRL 315. The PLMN requirements 317 may be stored in the network information database 307 while the requestor user route predictions 319 and requestor user preferences 313 may be received from a mobile device as part of a PRL request, or may be obtained from a mobile device subsequent to a PRL request in some embodiments. The requestor user preferences 313 and requestor user route predictions 319 may be stored in the user profile 239 by the client coordination function 221. The user profile 239 may then be sent to the PRL service function 303 along with, or as a part of, the request. In other embodiments, the requestor user route predictions 319 and requestor user preferences 313 may be sent occasionally or periodically to the PRL service function 303 and may be stored in the mobile device information database 309 and updated by the PRL service function 303 whenever new information is received. In one embodiment, sending the user profile 239 to the PRL service function 303 constitutes the request for a PRL.

The network information database 307 contains roaming connectivity information related to all of the heterogeneous wide area networks 110 in accordance with information obtained and collected from the mobile devices 130. The roaming connectivity information may include, but is not limited to, network statistics for coverage and data connectivity, PLMN IDs, PLMN cell IDs, frequency and band information, data and voice quality metrics, access technology employed, etc. In other words the network information database 307 serves as a roaming connectivity information database that can be used by the PRL service function 303 to assess roaming connectivity for PLMNs in specific geographic locations. The roaming connectivity information is "crowd-sourced" in that it is collected from various mobile devices 130 independently from the PLMNs themselves and without any PLMN involvement. In other words, the server 100 and PRL service function 303 are not part of any PLMN infrastructure but are independent from any specific PLMN. As was discussed above, each of the mobile devices 130 occasionally or periodically sends information to the server 100 related to its connectivity and service level obtained from its subscribed-to wide area network 110 and any visited wide area networks 110 (i.e. "roaming networks"). That is, each of the participating mobile devices 130 also includes the client coordination function 221 and other associated components shown in FIG. 2, such that each mobile device's client coordination function 221 manages the collection of such data in cooperation with the PRL service function 303. For example, the PRL service function 303 may determine how and when the data is sent by the mobile devices 130 to the server 100 and may provide each of the mobile devices 130 with scheduling information. Also as discussed previously above, the client coordination function 221 may also collect mobile device operations data that is specific to the mobile devices 130. This mobile device operation data may be stored in the user profile 239 and also sent to the PRL service function 303 along with the roaming connectivity information 115. The mobile device specific data may be stored in the mobile device information database 309 and used by the PRL service function 303 to generate mobile device specific PRLs that are based on known mobile device status at a given time, or on expected mobile device operations based on the specific mobile device operations history. Therefore there are two types of PRLs that may be generated by the PRL service function: a PRL based only on the geographic location of a mobile device and network information stored in the network information database 307; or a PRL based on geographic location and network information and additionally a user profile 239 that includes mobile device operations data and history and possibly destination and route prediction information. Put another way, a PRL may be location and PLMN related only, or may be generated based on location, PLMN, and mobile device specific knowledge contained in the mobile device information database 309.

Each one of the mobile devices 130 that participate in collecting and sending roaming connectivity information 115 is subscribed to a PRL service provided by the server 100 in accordance with the embodiments. Upon accessing and subscribing to the service provided by the server 100 each of the mobile devices 130 receives the client coordination function 221 by a download or by a push operation and the client coordination function executable code 237 is stored in memory 203 of each mobile device. In mobile device 200, for example, the executable code 237 provides executable instructions that are executable by the processor 201 to execute and run the client coordination function 221 in accordance with the embodiments. The execution of the executable code 237 by the processor 201 may also implement and run the device cognition module 225, data meter 227 and wireless data assessment engine 229. Also in accordance with the embodiments, the memory 203 of the mobile device 200 may store a PRL 233 which may be dynamically updated from time-to-time by the PRL service function 303 of the server 100 in conjunction with the client coordination function 221. PRL 233 is location specific and is useful only for the mobile device 200's most current location. In other words, as the mobile device 200 moves from geographic location to geographic location as defined by the PRL service function 303, the PRL 233 will be updated for the specific mobile device 200 location. This updating is done in accordance with the information stored in the mobile device information database 309 which includes the master PRL 311. The master PRL 311 is a listing of all wide area networks 110 and their respective allowable roaming partners which mobile devices 130 may utilize for specific geographic locations. In some embodiments, a mobile device user may also control user roaming settings (also referred to as user preferences) which may be provided as inputs to a user interface of the client coordination function 221 and which may be stored in the user profile 239. The client coordination function 221 user interface may be presented to the user on the display 215 of the mobile device 200. The settings or user preferences may then be sent to the PRL service function 303 and stored in the mobile device information database 309 for use in creating a customized PRL for that mobile device. In the example of FIG. 3, the requestor user preferences 313 are used to generate the customized PRL 315. In other words, the PRL service function 303 may take user preferences into account when generating a PRL for a specific user at a specific location.

In some instances, the mobile device information database 309 may also store customized PRLs, such as PRL 315, which may be generated in advance and which correspond to a specific mobile device and to a specific geographic location. This PRL may be generated in advance based on information received from the mobile device intelligent personal assistant, such as destination, route or travel predictions that predict that the mobile device user will be at a certain geographic location at a certain time. That is, the PRL service function 303 may predictively generate PRLs such that they may be sent automatically to the mobile device for use if and when the predicted conditions for the mobile device actually occur. In some embodiments, the predictive PRL may be sent automatically to a mobile device and then subsequently updated as further information is received from the client coordination function 221 of the given mobile device. Also, in some embodiments, the mobile device may request a PRL by sending a request message to the PRL service function 303. The request message may be sent in response to a user input (user request) or may be sent in response to a trigger condition similar to the trigger conditions used for determining when to send updates of roaming connectivity information. As discussed previously above, under certain trigger conditions, the mobile device may no longer be able to access the home wide area network to request or receive a PRL. In that case, the SMS client 223 may be used to send the request and to receive the PRL.

Therefore, in the event that a mobile device 130 requires network connectivity to establish a voice or data connection, the client coordination function 221 on the specific mobile device 130 may send a request message to the PRL service function 303 located on the server 100 using its home PLMN or using SMS if connectivity to the PLMN is not available. If a PRL currently exists that corresponds to the specific geographic location in which the requesting mobile device 130 is currently located then the PRL service function 303 will send that existing PRL to the mobile device 130. The mobile device 130 may then use that PRL to tune to a network and camp on an appropriate cell.

In some instances, a PRL may not be available for the specific geographic location where the mobile device 130 is currently located. In that situation, the PRL service function 303 may send out information update requests to any participating mobile devices that happen to be located in the specific geographic location and attempt to generate a new PRL for that geographic location. These methods of operation may be further understood with respect to the flowcharts provided in FIG. 4 through FIG. 6.

Figure 4:
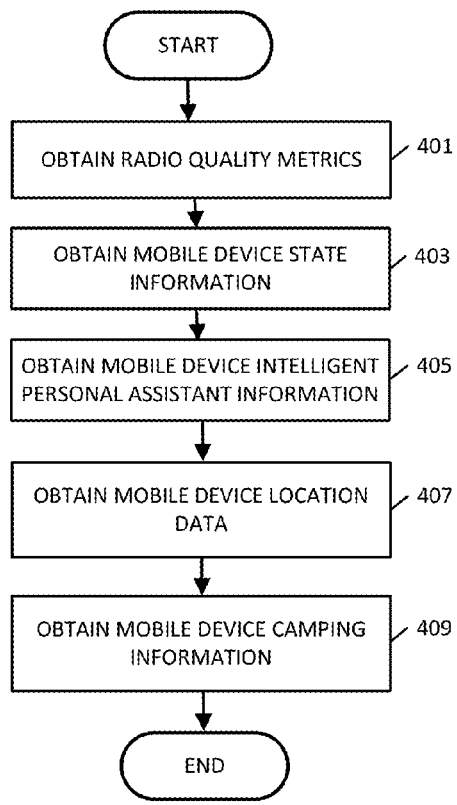
FIG. 4 is flowchart of a method of operation of a mobile device for collecting roaming connectivity information and mobile device operation data in accordance with an embodiment.

FIG. 4 illustrates a method of operation of the mobile devices 130 in accordance with the embodiments. That is, all of the mobile devices 130 that are subscribed to the PRL service (participating mobile devices) will send the information in accordance with the method of operation as shown in FIG. 4. It is to be understood that user preferences may limit some of the information that is sent by any specific mobile device. In operation block 401, a mobile device obtains radio quality metrics based on RF coverage at a given location from the mobile device's subscribed-to wide area network 110 or from a visited wide area network on which the mobile device is camped or from which the mobile device is accessing services. In some embodiments, the mobile device may also collect mobile device state information as shown in operation block 403. The state information, which is part of mobile device operations data, may be obtained from mobile device sensors using, for example, the sensor hub 219 shown in FIG. 2. Other state information may also be obtained from the processor 201 such as, for example, battery charge state, CPU utilization, or other state related information. This state information may be used by the PRL service function 303 to prioritize PLMNs listed on a customized PRL. Prioritization methods of operations are discussed in further detail herein below.

In operation block 405, information may be obtained from a mobile device intelligent personal assistant, if present on the mobile device and if such information is available. The intelligent personal assistant information may include user route prediction or predictions of when the user will be at a certain geographic location at a certain time. The PRL service function 303 may also use this information to generate customized PRLs for the mobile device user's predicted location. In some embodiments, as discussed above previously, the mobile device user may control whether or not intelligent personal assistant information is sent by adjusting appropriate user preference settings. The intelligent personal assistant 235 may monitor various other mobile device 200 applications 231 such as, but not limited to, a calendar application, airline flight ticket purchases made through web browsers, location detection logic 213 location information history, etc., and may thereby predict that the mobile device 200 user will be a specific location at a specific time. The client coordination function 221 may communicate with the intelligent personal assistance 235 using an API and may obtain the predicted location information and predicted time range. The predicted time range may be any suitable time granularity such as months, weeks, days, hours, etc. and the location information may be, for example, global positioning system (GPS) coordinates or some other type of location coordinates that can be correlated to PLMN RF coverage areas by the PRL service function 303. The client coordination function 221 may send the predicted time range and location information to the PRL service function 303 such that a custom PRL for the mobile device 200 can be generated for the predicted location. The PRL service function 303 may then send the customized PRL to the mobile device 200 prior to the predicted time range such that the PRL is available to the mobile device 200 if in fact the mobile device 200 user travels to the location during the predicted time range.

In operation block 407, current mobile device location data will be obtained, for example, by obtaining data from location detection logic 213 and this location data will be used to geo-tag roaming connectivity information, mobile device operations data or both. In operation block 409, the client coordination function 221 will obtain a PLMN ID, frequency and band information for the PLMN on which the mobile device is camped on or from which the mobile device is currently accessing services. All of the information obtained in operation blocks 401, 403, 405 and 407 is then sent by the particular mobile device's client coordination function 221 to the PRL service function 303 located on the server 100. The information is then stored in the network information database 307 and the mobile device information database 309 accordingly.

Figure 5:
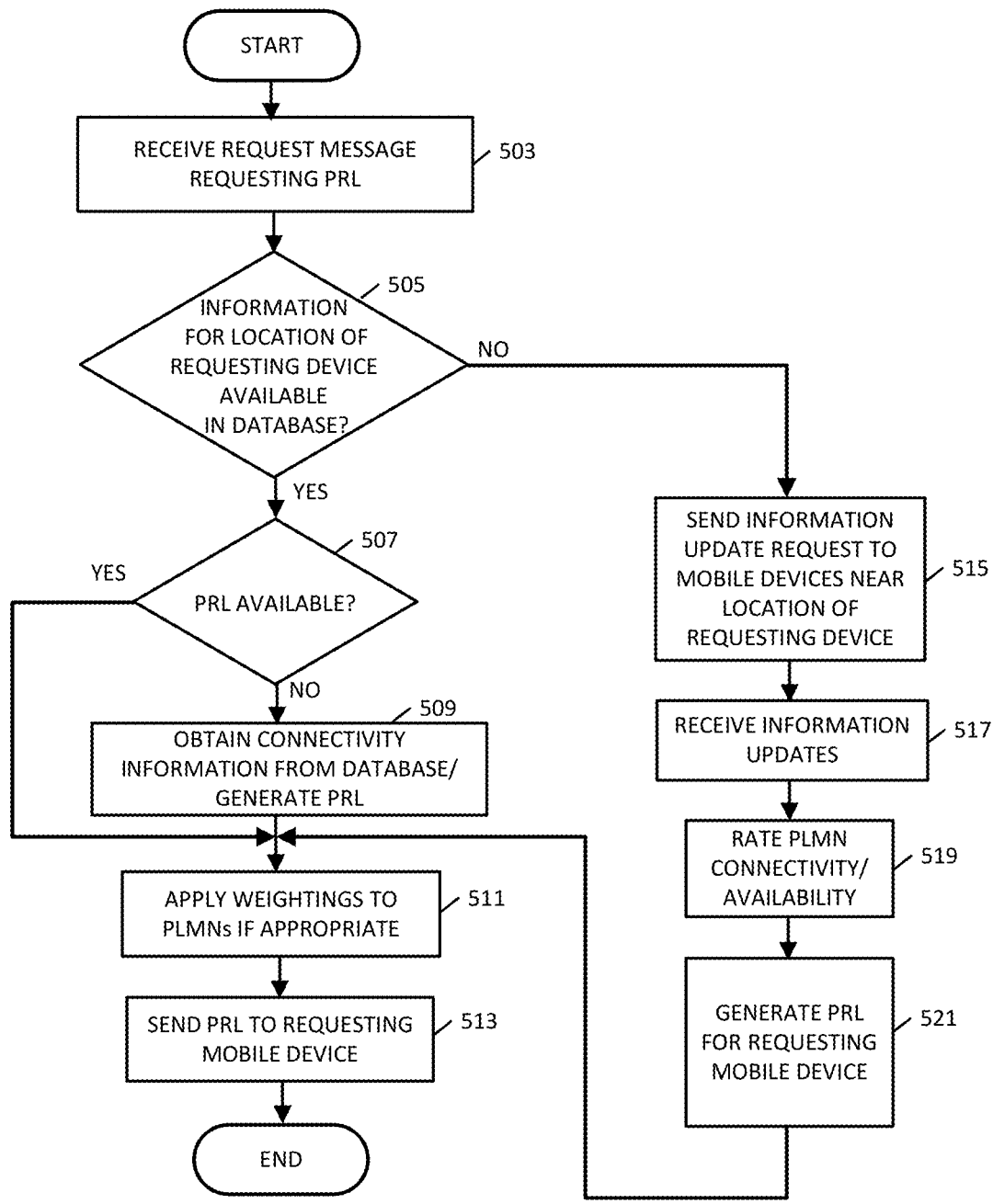
FIG. 5 is a flowchart of a method of operation of a server for generating a preferred roaming list in response to a request in accordance with an embodiment.
Figure 7:
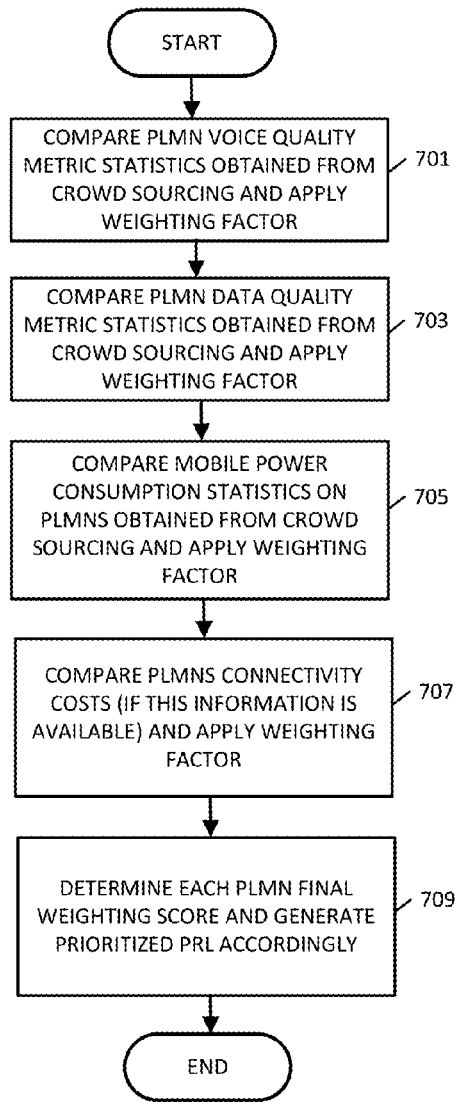
FIG. 7 is a flowchart of a method of operation of a server for prioritizing a preferred roaming list in accordance with an embodiment.
Figure 8:
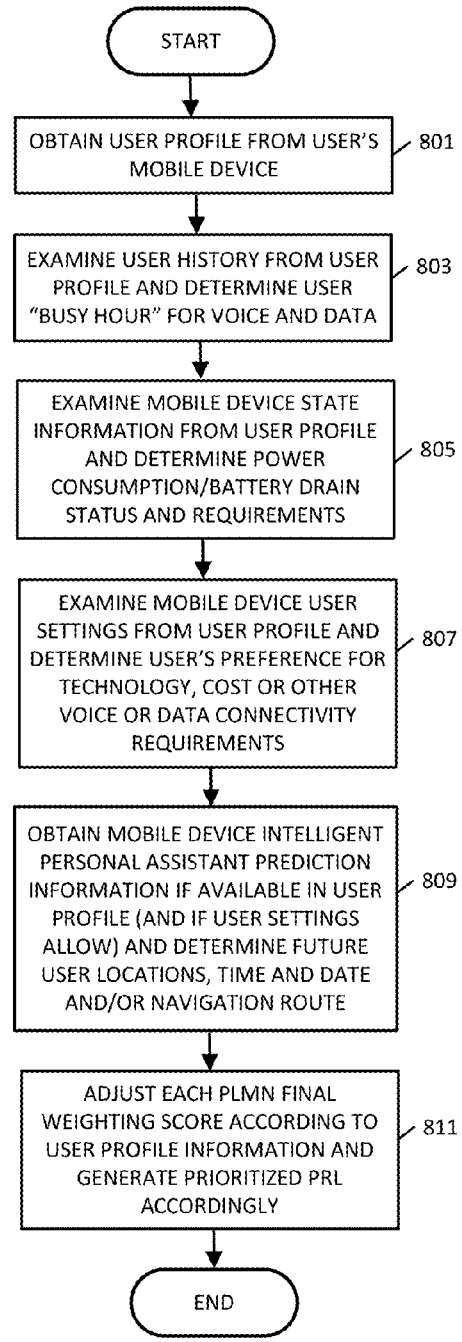
FIG. 8 is a flowchart of a method of operation of a server for prioritizing a preferred roaming list in accordance with an embodiment.
Figure 9:
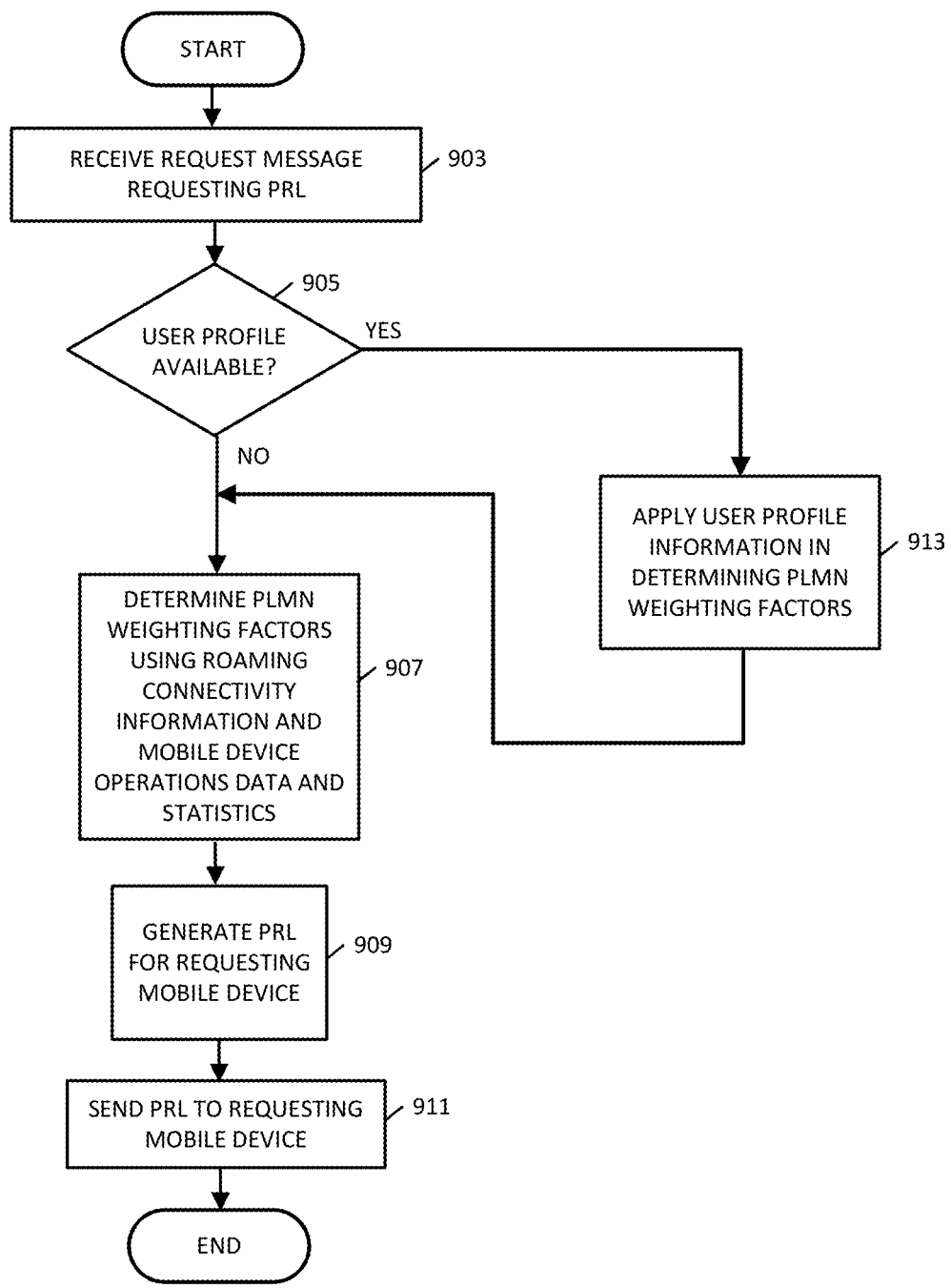
FIG. 9 is a flowchart of a method of operation of a server for generating a preferred roaming list in accordance with an embodiment.

Turning to FIG. 5, a method of operation of the server 100 in accordance with an embodiment is illustrated. In operation block 503, the server 100 (and thus the PRL service function 303) may obtain a request message requesting a PRL from the client coordination function 221 of a mobile device. This request message may be sent via one of the wide area networks 110 or via SMS messages using the SMS client 223. That is, if the mobile device connectivity with its home network is waning or location information indicates that the mobile device will soon be out of RF coverage range, SMS may be used to obtain a PRL. In other words, in a situation in which a packet bearer is not available to the mobile device, SMS service will still be available. In one example, the client coordination function 221 may communicate with the SMS client 223, using an API, and send an SMS message containing a PRL request message to the PRL service function 303. The PRL request message will include at least location information and may also include device state information, time information or combinations of these. The information included in the PRL request message is formatted by the client coordination function 221 in a format useable by the PRL service function 303. Regardless of how the PRL request message is sent, the PRL service function 303, in decision block 505, will check if roaming connectivity information 115 for the location of the requesting mobile device is available in the network information database 307. If yes, then the PRL service function 303 will check to see if a PRL is available as shown in decision block 507. If a PRL is available for that location, the PRL service function 303 may prioritize the listed PLMNs by applying a weighting algorithm in operation block 511 which may be based on various factors including, but not limited to, user preference settings, mobile device capabilities, etc. Further details of methods of operation for prioritization of a PRL are illustrated in FIG. 7 through FIG. 9 which are described herein below. As a brief example, some PLMNs may provide the mobile device with better service options based on the radio access technology where other networks with different, or less advanced, radio technologies may provide lesser service options and capabilities. Those networks with better service options may therefore be higher weighted and therefore higher prioritized than other PLMNs. However, if the service cost is higher for the mobile device user, the user's preference settings may cause the PRL service function 303 to place a higher weight on PLMNs that provide a lesser grade of service but at a lower cost to the user.

If a PRL is not available in decision block 507, the method of operation proceeds to operation block 509 in which the PRL service function 303 will search the database for roaming network information and will generate a new PRL. In this case, the method of operation will again proceed to operation block 511 and will apply a weighting algorithm if appropriate. The PRL service function 303 will then send the customized PRL to the requestor mobile device in operation block 513 and the method of operation ends as shown. The roaming information provided by the PRL will include, among other things, PLMN IDs, frequency and band information such that the mobile device may rapidly tune to a PLMN cell and proceed to camp on the cell.

Returning to decision block 505, if roaming connectivity information for the location of the requestor mobile device is not available in the network information database 307, the method of operation proceeds to operation block 515. In operation block 515, the PRL service function 303 sends a roaming connectivity information update request to participating mobile devices that are known to be in a location near the requestor mobile device. This is determined by checking the mobile device information database 309 which is updated on an occasional or periodic basis as was described previously above. In operation block 517, the PRL service function 303 receives the updates and, in operation block 519, proceeds to rate the PLMN connectivity and availability for PLMNs serving the location of the requestor mobile device. The PRL service function 303 may also check the master PRL 311 and/or the network information database 307 to determine if any PRLs are forbidden by the requestor mobile device's home PLMN. The PLMN ratings in operation block 519 may be performed using any of the information contained in the mobile device information database 309 (including user preference settings) and the network information database 307 and may include application of weighting algorithms as discussed above.

In operation block 521, the PRL service function 303 creates the PRL that will be sent to the requestor mobile device. The method of operation may then continue to operation block 511 and continue as was described above until the method of operation ends. In other words, the PRL service function 303 may apply a weighting algorithm to the newly created PRL as shown in operation block 511 and will send the PRL to the requesting mobile device in operation block 513, etc.

Figure 6:
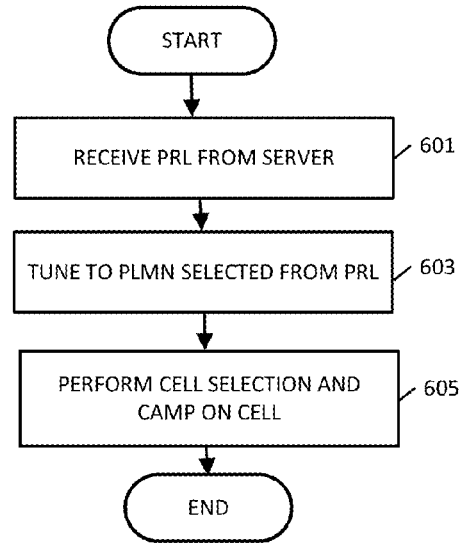
FIG. 6 is a flowchart of a method of operation of a mobile device for receiving and using a preferred roaming list in accordance with an embodiment.

FIG. 6 illustrates a method of operation that occurs on the requestor mobile device in accordance with an embodiment. After the method of operation shown in FIG. 5 is completed, the requestor mobile device will receive the PRL from the server 100 as shown in operation block 601. In operation block 603, the client coordination function 221 on the requestor mobile device will select a PLMN and will attempt to tune its radio transceiver to a frequency and band as indicated in the PRL. In some embodiments, the client coordination function 221 will receive the PRL from the server 100 and will itself perform a weighting algorithm, or otherwise check user preference settings, to decide which PLMN is most appropriate. However the client coordination function 221 may, in some embodiments, select the PLMN based on the results of a weighting algorithm performed by the PRL service function 303 in operation block 511 or operation block 519 of FIG. 5. In operation block 605, the requestor mobile device will perform a cell selection procedure and will proceed to camp of the selected cell of the PLMN. The method of operation then ends as shown.

Thus in the various embodiments each mobile device 130 subscribed to the PRL service acts to collect wide area network roaming connectivity information which may include physical layer and data layer connectivity information from various different, heterogeneous wide area networks 110. Put another way, the mobile devices 130 act as connectivity information collectors and a data crowd-source for the PRL service and are used to create the network information database 307 and the mobile device information database 309 and keep them updated. The server 100 receives the network connectivity information which is related to the specific wide area networks within specific geographic locations. These operations are performed independently and without any involvement of the wide area networks 110 themselves. The PRL service function 303, the mobile device client coordination function 221 or both are operative to use the collected information to determine that data connectivity in a given location is below an acceptable criteria. That is, historical information regarding the network connectivity information is stored along with specific mobile device connectivity information which is used to generate network statistics for the various wide area networks 110. Statistics related to the network may then be stored in the network information database 307 while statistics specific to individual mobile device connectivity may be stored in the mobile device information database 309. That is, the network information database 307 may include a network statistics database. The statistics are determined based on collected information and the calculation and determination of such network statistics may be configured through a user interface to the server 100 and the PRL service function 303. Likewise, the mobile device information database 309 includes a mobile device statistics database for mobile device operations data and connectivity at various locations and times. These statistic determinations and calculations may also be configurable through a user interface to server 100 and the PRL service function 303 similar to the case for the network information database 307. In other words the "views" into the collected information may be changed from time-to-time based on application of various statistical analysis techniques to the collected information. More particularly, physical layer and data layer connectivity information collected from the various mobile devices and stored in the network information database 307 is related to the specific wide area networks from which this data is collected and is related to a plurality of geographic locations to create a network statistics database. Thus the network information database 307 may be considered to be a network statistics database.

The PRL service function 303 generates lists of roaming networks to serve as visited networks based on either the network connectivity information and, if appropriate, also based on specific mobile device information, i.e. mobile device operations data and user predictive data. A roaming network may be selected for inclusion on a customize PRL based on a cost metric which may include predicting data requirements at a given time and given location for a specific mobile device by using the mobile device operations data which includes the mobile device history. The master coordination function thus operates to provide a PRL to at least one mobile device located within a given location either in response to a request message from the mobile device, or in response to prediction that the mobile device is about to enter into a geographic location having poor RF coverage from a current serving network. The prediction may be facilitated by either the PRL service function 303, the client coordination function 221, or both in cooperation, and may use information from the intelligent personal assistant 235.

The mobile devices 130 may send information to the server 100 that is related to, for example, wireless quality, wireless cost, usage context, etc. Therefore based on either a mobile device's location or per a request message (i.e. "on-demand" by a mobile device) the PRL service function 303 may prioritize a set of roaming networks based on a weighting algorithm. The mobile device may thus receive connectivity information from the PRL service function 303 in advance or losing its serving network connectivity. In some embodiments, the backhaul traffic conditions for specific roaming networks may also be included in the connectivity information sent to the mobile device in the customized PRL.

In some embodiments, a weighting algorithm may take into account radio networking costs and may compute a spectral efficiency metric. For example, this may be accomplished using the average CQI reported by the mobile device as per standards. An averaged current drain (bits/mA) metric may also be computed using, for example, averaged "PUSCH Tx Pwr" and mapping it against the current drain profile for specific mobile devices based on empirical measurements for some mobile devices and in some embodiments. A radio link quality metric may be computed using the averaged cell signal quality measurements RSRP, RSRQ, SNR, DL BLER, CQI, UL BLER, RXLEV or RXQUAL in a GSM system, Echo in WCDMA, or any other appropriate metric, etc. against pre-registered thresholds for each measurement. All of the above example measurements may be reported to the server 100 by each mobile device, where the PRL service function 303 acts to rank possible roaming networks based on their generated metrics in real-time.

Some examples of how the PRL service function 303 may rank possible roaming networks by using weighting factors are illustrated in FIG. 7 through FIG. 9. In operation block 701, the PRL service function 303 will compare PLMN voice quality metric statistics obtained by crowd sourced data sent by the participating mobile devices 130. The PRL service function 303 may apply a higher weighting factor to those PLMNs that exhibit a given voice quality metric that is better than the voice quality metrics observed for other PLMNs. In operation block 703, a similar approach may be used with respect to data quality metrics observed for the various PLMNs in the crowd sourced data. In operation block 705, the PRL service function 303 may also apply weighting factors based on mobile device operations data. For example, the PRL service function 303 may aggregate crowd sourced data related to mobile device power consumption on the various PLMNs. A higher weighting factor may be applied to those PLMNs for which the aggregated mobile device power consumption is relatively low in comparison with power consumption observed for connectivity to other PLMNs. In operation block 707, the connectivity costs of various PLMNs may be compared and weighting factors may be applied by the PRL service function 303 based on these costs. In the example of operation block 707, the costs may relate to actual monetary costs of the connectivity. However, the power consumption information used in operation block 705 may also be used as a contribution to a cost function that takes into account mobile device operations data such as, but not limited to, power consumption. In other words, the operation of operation block 707 may be a cost function that takes into account mobile operations data, monetary cost of the PLMN connection, or any other data that may be suitable for inclusion in a cost function. If operation block 707 is a cost function that includes mobile device power consumption, then operation block 705 will be excluded as power consumption will be included in the cost function. In operation block 709, the PRL service function 303 will determine a final weighting score for each PLMN based on operation blocks 701 through 707 and will generate a prioritized PRL accordingly. The method of operation then ends. The method of operation illustrated by FIG. 7 relates to generation of a PRL based on location information and roaming network connectivity information contained in the network information database 307 only. A method of operation for generating a customize PRL that includes mobile device operations information stored in the mobile device information database 309 for the specific requesting mobile device is illustrated by the flowchart of FIG. 8.

In operation block 801, the PRL service function 303 may obtain the user profile 239 from a given mobile device. In operation block 803, the PRL service function 303 will examine the user history from the user profile 239 and determine the user's "busy hour" for voice and data on the given mobile device. For example, mobile device operations history may show that the user tends to have high data usage after 6 PM on Monday, Wednesday and Friday and may have high voice data usage on Saturdays and Sundays from 1 PM to 3 PM. The PRL service function 303 may use this information to further prioritize PLMNs listed on the customized PRL for that mobile device and user, or may restrict the PRL to PLMNs that would be best for the particular time and day of the PRL request, based on the user's known voice and data usage history.

In operation block 805, the PRL service function 303 may examine mobile device state information contained in the user profile 239 and determine the power consumption or battery drain status as well as other requirements for the given mobile device. In operation block 807, the PRL service function 303 may examine any user settings contained in the user profile 239 and may determine the user's preference for access technology, connectivity cost or other voice or data connectivity requirements. In operation block 809, the PRL service function 303 may obtain mobile device intelligent personal assistant 235 prediction information if it is available and if the user profile 239 user settings allow this information to be obtained. The PRL service function 303 may then determine future user locations, time and date, and/or navigation route for that user. In operation block 811 the PRL service function 303 may then adjust the final weighting score for each PLMN according to the user profile information described in operation blocks 803 through 809 and may generate a prioritized PRL accordingly.

Turning to FIG. 9, in operation block 903, the PRL service function 303 may receive a request message requesting a PRL from a given mobile device. As was discussed above previously, the user profile 239 may constitute the PRL request in some embodiments. However in other embodiments, the user profile 239 will be sent as part of, or along with, the PRL request. If the user profile 239 is available to the PRL service function 303 as shown in decision block 905, then, in operation block 913, the PRL service function 303 will apply the user profile 239 information in determining weighting factors for the PLMNs listed on the customized PRL. If the user profile is not available in in decision block 905, then, in operation block 907, the PRL service function 303 will determine PLMN weighting factors using only the roaming connectivity information and the aggregated, crowd sourced mobile device operations data and statistics contained in the network information database 307 and the mobile device information database 309, respectively. In other words, the PRL service function 303 will not use any mobile device specific mobile device operations data to generate the PRL. When the user profile is available in decision block 905, then operation block 913 as well as operation block 907 will be performed. In either scenario, a PRL will be generated for the requesting mobile device as shown in operation block 909, and the PRL will be sent to the requesting mobile device in operation block 911 at which point the method of operation ends.

The actual weighting factors that are applied in the methods of operation illustrated in FIG. 7 and FIG. 8 may be based on some granular level that is specific to the metrics employed in making the weighting determination. As a possible example, a value of 10 may be added or subtracted to an RXQual level (or some other metric level) between a given predetermined threshold range while a value of five may be added or subtracted for a level between another predetermined threshold range. In other words, any appropriate weighting factor or weighting technique may be used, however the weighting factors and how those weighting factors are added, subtracted, or multiplied against the observed metrics will depend upon predetermined thresholds or ranges, the metrics themselves, and normalization techniques, such that the weighted values for each of the weighted metrics can be used to generate a total weighting score that makes sense when compared with the weighting scores of other PLMNs.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
   receiving roaming connectivity information at a server, the roaming connectivity information for a plurality of wide area networks collected by a plurality of mobile devices, when the plurality of mobile devices are roaming, independently of the plurality of wide area networks;
   relating the roaming connectivity information to the plurality of wide area networks and to a plurality of geographic locations to create a network information database;
   receiving location prediction information from a specific mobile device, the location prediction information indicating a predicted location of the specific mobile device at a certain time;
   generating a list of candidate wide area networks to serve as roaming networks for the specific mobile device based on the predicted location and the roaming connectivity information; and
   sending a preferred roaming list to the specific mobile device, the preferred roaming list including the list of candidate wide area networks.

2. The method of claim 1, wherein receiving the roaming connectivity information at the server comprises:
   receiving the roaming connectivity information over an Internet Protocol connection from each of the plurality of mobile devices at the server.

3. The method of claim 1, further comprising:
   prioritizing the list of candidate wide area networks of the preferred roaming list.

4. The method of claim 3, wherein prioritizing the list of candidate wide area networks of the preferred roaming list, comprises:
   receiving mobile device state information or user preferences from the specific mobile device; and
   prioritizing the list of candidate wide area networks based on the mobile device state information or the user preferences.

5. The method of claim 3, wherein prioritizing the list of candidate wide area networks of the preferred roaming list, comprises:
   determining that a physical layer or data layer connectivity in a given geographic location for the specific mobile device is below an acceptable criteria based on the roaming connectivity information; and
   prioritizing the list of candidate wide area networks based on the physical layer or data layer connectivity provided at the given geographic location.

6. The method of claim 3, further comprising:
   predicting data usage requirements at a given time and at a given geographic location for the specific mobile device; and
   prioritizing the list of candidate wide area networks based on the prediction of the data usage requirements.

7. The method of claim 1, further comprising:
   generating the list of candidate wide area networks to serve as the roaming networks for the specific mobile device in response to a request message from the specific mobile device.

8. The method of claim 1, further comprising:
   sending the preferred roaming list to the specific mobile device in response to a request message from the specific mobile device.

9. A method of claim 1, further comprising:
receiving a request message from the specific mobile device requesting the preferred roaming list for a given geographic location;
sending roaming information update requests to the plurality of mobile devices located in the given geographic location related to the request message;
rating access capabilities for a plurality of candidate wireless networks based on the received roaming information updates collected by the plurality of mobile devices when the plurality of mobile devices are roaming; and
sending the preferred roaming list to the specific mobile device listing the plurality of candidate wireless networks along with an access capability indication for each of the plurality of candidate wireless networks.

10. A server comprising:
a network transceiver, operative to provide a connection to the Internet;
a roaming network connectivity database operative to store network statistics and roaming network connectivity information; and
at least one processor, operatively coupled to the network transceiver and to the roaming network connectivity database, the at least one processor operative to:
collect the roaming network connectivity information for a plurality of wide area networks from a plurality of mobile devices, the roaming network connectivity information for the plurality of wide area networks collected by the plurality of mobile devices, when the plurality of mobile devices are roaming, independently of the plurality of wide area networks via the Internet;
receive the roaming network connectivity information and relate the roaming network connectivity information to the plurality of wide area networks and to a plurality of geographic locations to create the roaming network connectivity database;
receive location prediction information from a specific mobile device, the location prediction information indicating a predicted location of the specific mobile device at a certain time;
generate a list of candidate wide area networks to serve as roaming networks for the specific mobile device based on the predicted location and the roaming network connectivity information; and
send a preferred roaming list to the specific mobile device, the preferred roaming list including the list of candidate wide area networks.

11. The server of claim 10, wherein the at least one processor is operative to receive the roaming network connectivity information by receiving the roaming network connectivity information over an Internet Protocol connection from each of the plurality of mobile devices.

12. The server of claim 10, wherein the at least one processor is further operative to:
prioritize the list of candidate wide area networks of the preferred roaming list.

13. The server of claim 12, wherein the at least one processor is further operative to prioritize the list of candidate wide area networks of the preferred roaming list, by:
receiving mobile device state information or user preferences from the specific mobile device; and
prioritizing the list of candidate wide area networks based on the mobile device state information or the user preferences.

14. The server of claim 12, wherein the at least one processor is further operative to prioritize the list of candidate wide area networks of the preferred roaming list, by:
determining that a physical layer or data layer connectivity in a given geographic location for the specific mobile device is below an acceptable criteria based on the roaming network connectivity information; and
prioritizing the list of candidate wide area networks based on the physical layer or data layer connectivity provided at the given geographic location.

15. The server of claim 12, wherein the at least one processor is further operative to:
predict data usage requirements at a given time and at a given geographic location for the specific mobile device; and
prioritize the list of candidate wide area networks based on the prediction of the data usage requirements.

16. The server of claim 10, wherein the at least one processor is further operative to:
generate the list of candidate wide area networks to serve as the roaming networks for the specific mobile device in response to a request message from the specific mobile device.

17. The server of claim 10, wherein the at least one processor is further operative to:
send the preferred roaming list to the specific mobile device in response to a request message from the specific mobile device.

18. The server of claim 10, wherein the at least one processor is further operative to:
receive a request message from the specific mobile device requesting the preferred roaming list for a given geographic location;
send roaming information update requests to the plurality of mobile devices located in the given geographic location related to the request message;
rate access capabilities for a plurality of candidate wireless networks based on the received roaming information updates collected by the plurality of mobile devices when the plurality of mobile devices are roaming; and
send the preferred roaming list to the specific mobile device listing the plurality of candidate wireless networks along with an access capability indication for each of the plurality of candidate wireless networks.

* * * * *